(No Model.)

M. W. ROBINSON.
GALVANIC BATTERY.

No. 447,016. Patented Feb. 24, 1891.

Witnesses
Albert E. Leach
M. H. Thompson

Inventor
Martin W. Robinson
by Wm. B. H. Dowse
Atty.

UNITED STATES PATENT OFFICE.

MARTIN W. ROBINSON, OF MEDFORD, MASSACHUSETTS, ASSIGNOR TO THE VULCAN ELECTRIC COMPANY, OF KITTERY, MAINE.

GALVANIC BATTERY.

SPECIFICATION forming part of Letters Patent No. 447,016, dated February 24, 1891.

Application filed June 6, 1890. Serial No. 354,482. (No model.)

*To all whom it may concern:*

Be it known that I, MARTIN W. ROBINSON, a citizen of the United States, residing at Medford, in the county of Middlesex and Commonwealth of Massachusetts, have invented certain new and useful Improvements in Electric Batteries, of which the following is a specification.

Figure 1:
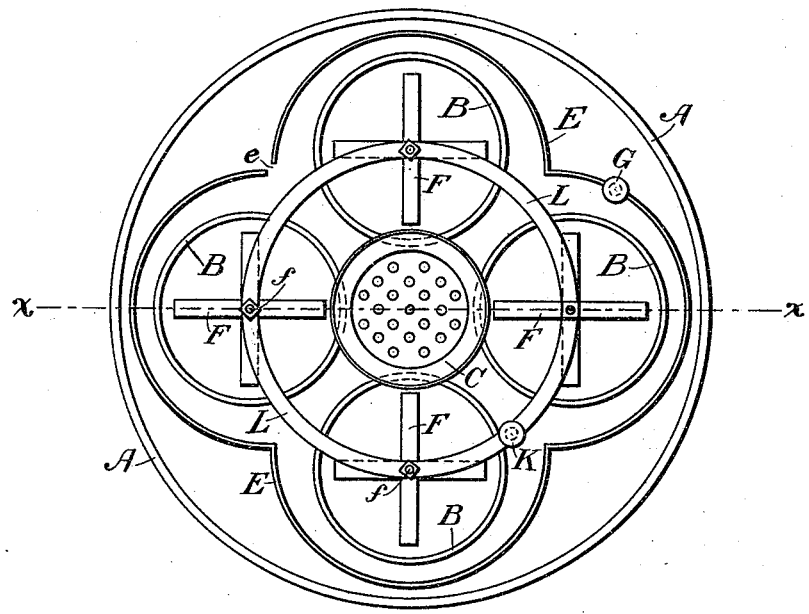
Figure 2:
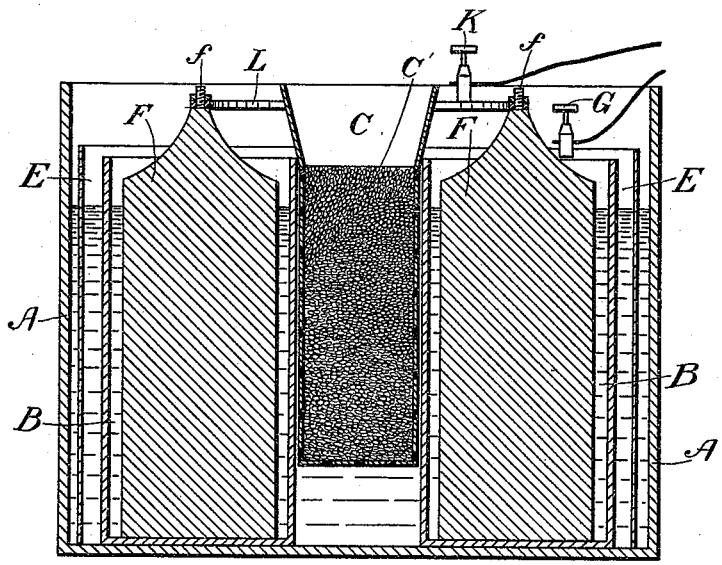

Of the accompanying drawings, Figure 1 is a plan view of a form of cell which, in connection with the solutions hereinafter described, embodies my invention. Fig. 2 is a vertical section on line $x$ $x$, Fig. 1.

My invention consists of an improved battery wherein by the peculiar arrangement of the solutions with reference to the elements of the battery local action is entirely done away with, and from the fact that there is absolutely no chemical action except when the circuit is closed it becomes unnecessary to amalgamate the zinc plate used therein.

The form of battery-cell herein shown is what might be termed a "quadruple cell," there being four porous cups containing separate positive elements immersed in a single outer vessel containing one continuous negative element.

A is the outer jar or vessel, made in any desired form.

B B B B are a number of porous cups (in this case four) resting directly within the outer vessel. These contain the positive or zinc elements F, preferably made cruciform, as shown, so as to expose considerable surface to the liquid within the cup. These elements F are connected together by means of a ring L, secured to the tops thereof in any desired manner, as by screws $f$ passing through the ring and held by nuts, as shown in the drawings. The negative element (preferably copper) is bent around the porous cups in the manner shown in Fig. 1, the ends not meeting, but leaving an opening $e$ between them. The ring L is provided with the screw K, forming the electrode for the zinc elements, while the screw G forms the electrode for the copper plate E.

An important feature of my improved battery consists in the peculiar arrangement of the solutions with respect to the elements thereof and with respect to each other. I employ for a bath for my positive or zinc plates within the porous cups either chromic acid or any solution of a chromate or bichromate—such as bichromate of potash, soda, or manganese. The copper or negative plate has for a bath sulphate of copper.

I prefer to use for my zinc bath a mixture of the following elements, viz: sal-ammoniac, chromic acid, bisulphate of mercury, and muriatic acid. The two latter—viz., bisulphate of mercury and muriatic acid—are not essential. When these two are left out and the first two—viz., sal-ammoniac and chromic acid—used alone for the zinc solution, the action, while less strong, is more even. By the employment of all four materials as above for the zinc bath the action is considerably stronger for a time, but does not continue so long. A solution of copper sulphate is poured directly into the outer vessel, and within this is immersed the perforated feed-cup C, held in suspension by its flaring top between the porous cups and containing within it copper crystals C'. By the action of a battery so arranged with materials combined in proper proportions a current of great electro-motive force is produced, especially useful, among other purposes, for lighting and power, or as a common gravity-cell.

I do not limit the use of my solutions to the exact mechanical construction here shown, as a simpler form containing a single porous cup and positive element may, if desired, be used. A compound cell constructed in the manner above described is, however, especially well adapted to be used for electric-lighting.

I claim—

1. A bath for one element of a battery, containing a chromate, bichromate, or chromic acid, in combination with a bath for the opposite element, consisting of sulphate of copper, substantially as described.

2. In a battery, the combination, with the positive element immersed in a bath containing sal-ammoniac and either a chromate, a bichromate, or chromic acid, of the negative element immersed in a bath consisting of sulphate of copper, substantially as described.

3. The bath for the positive element of a battery, consisting of bisulphate of mercury, muriatic acid, sal-ammoniac, and either a chromate, a bichromate, or chromic acid, in combination with the bath for the negative element, consisting of sulphate of copper, substantially as described.

4. A compound battery-cell consisting of the combination, with an outer jar or vessel, of a single negative element and two or more porous cups contained in said jar, a separate positive element contained in each of said cups, and suitable baths for both positive and negative elements, substantially as described.

5. A compound battery-cell consisting of the combination, with a single outer jar containing a single negative element and bath, of two or more separate porous cups contained in said jar, separate positive elements cruciform in transverse section contained in said porous cups, with suitable baths, and a ring connecting said positive elements, constructed and arranged substantially as described.

In witness whereof I have hereunto set my hand.

MARTIN W. ROBINSON.

Witnesses:
WM. B. H. DOWSE,
ALBERT E. LEACH.